Dec. 1, 1959    W. F. BIEDEBACH, JR., ET AL    2,915,425
CENTRIFUGAL IMPREGNATING PROCESS OF MAKING A PRESSURE TANK
Filed March 4, 1955

INVENTORS.
WILLIAM F. BIEDEBACH, JR.
LAURENCE L. HILTON
BY
Christie, Parker & Hale
ATTORNEYS 2,915,425

CENTRIFUGAL IMPREGNATING PROCESS OF MAKING A PRESSURE TANK

William F. Biedebach, Jr., and Laurence L. Hilton, Altadena, Calif.

Application March 4, 1955, Serial No. 492,185

9 Claims. (Cl. 154—83)

This invention relates to processes for impregnating a porous material with a binder substance and causing the material to assume a rigid shape. It has particular reference to a centrifugal impregnating process for fabricating a pressure tank.

The conventional process for forming a flexible porous material into a rigid shape is by impregnating the material with a resinous substance through the use of a male and a female mold. One or more layers of the material and a quantity of the resinous substance are put into the female mold. The male mold is inserted and pressure is applied which forces the resin into the material. The resin is then cured or hardened and when the material is removed from the mold it is in a rigid form of the shape of the mold.

It is desirable for some purposes, such as for water softening, to provide a tank which will withstand strong pressures, which is chemically inert for its intended use, and which can be economically fabricated.

Using the conventional process for fabricating such a tank requires that the tank be formed in pieces, and that these pieces be bound together to form the whole tank. When the conventional process is completed, it is not unusual to find that the seams binding the pieces together are weaker than other portions of the tank and form a non-uniform part of the tank. Otherwise, to form a seamless tank requires a cumbersome process such as using an expandable bag inside a hollow mold.

We have devised a centrifugal process for making such a tank which avoids these difficulties and which results in a tank which is virtually of one-piece construction for all practical purposes.

In one embodiment the tank made according to the process of the invention comprises two cup-shaped pressure heads having edge portions or skirts, and a substantially hollow and cylindrical body intercoupling the pressure heads by overlapping the edge portions at each of its respective ends. The edge portions of the pressure heads and the respective ends of the cylindrical body are preferably tapered to fit, and are bonded together by impregnation with a hardening resinous substance. The tank so formed has smooth surfaces and for all practical purposes is of one-piece construction, its overlapping portions or seams being practically invisible and being as strong as other portions of the tank.

The process of the invention is a forming process for shaping a flexible material, as for example into a tank as described, which comprises confining a sheet of such material within a rotatable forming member together with a solidifiable liquid binder, rotating the forming member to cause the sheet to conform to the inside surface of the forming member and to force the binder into the sheet, and continuing to rotate the forming member while the binder solidifies.

An apparatus for carrying out the process to form the subject tank includes a cylindrical forming member supported on a plurality of free rollers for rotation about its longitudinal axis. Power means are provided for rotating the forming member, and heating means are provided for heating the interior of the member while the member is rotating.

In fabricating the tank, the two cup-shaped pressure heads are formed by the previously mentioned conventional molding process employing male and female molds. However, the amount of resinous substance in the process is controlled so that the edge portions of the pressure heads remain unimpregnated, which is an important modification of the usual procedure.

The pressure heads are inserted into the forming member and a roll of unimpregnated material is disposed between the pressure heads so that each end of the roll overlaps the respective unimpregnated edge portions of the pressure heads. The forming member is rotated so that the centrifugal force created causes the roll of material to unwind and conform to the inside surface of the forming member with the ends of the expanded roll overlapping the edges of the respective pressure heads and with the material of the expanded roll overlapping itself. The resinous binder substance is introduced within the rotating forming member, and the centrifugal force causes the binder substance to soak into the material. While the member is still rotating, the resinous substance is hardened to make the material rigid and to bond the overlapping portions of the material together.

For purposes of fabricating the subject tank, Fiberglas material is preferred because of its chemical inertness, its strength and its low cost. Also, thermo-setting binder substances such as polyester resins, polystyrene and epoxy resins are preferred, and it is found that heating facilitates the removal of the tank from the member.

It has been found that if the overlapping portions of the material are tapered to fit each other, very smooth and strong seams result. Also, it has been found that all overlapping portions should overlap for a distance greater than the length of the fiber in the material to make the strongest seams.

The process is described with regard to making a special kind of tank, but it can be used advantageously to make other articles where the requirement exists to reinforce porous material with a binder substance. The process is easily adaptable for making a variety of shapes and can be used with most any porous material and binder substance.

The process is described in detail with reference to the drawings, in which.

Figure 1:
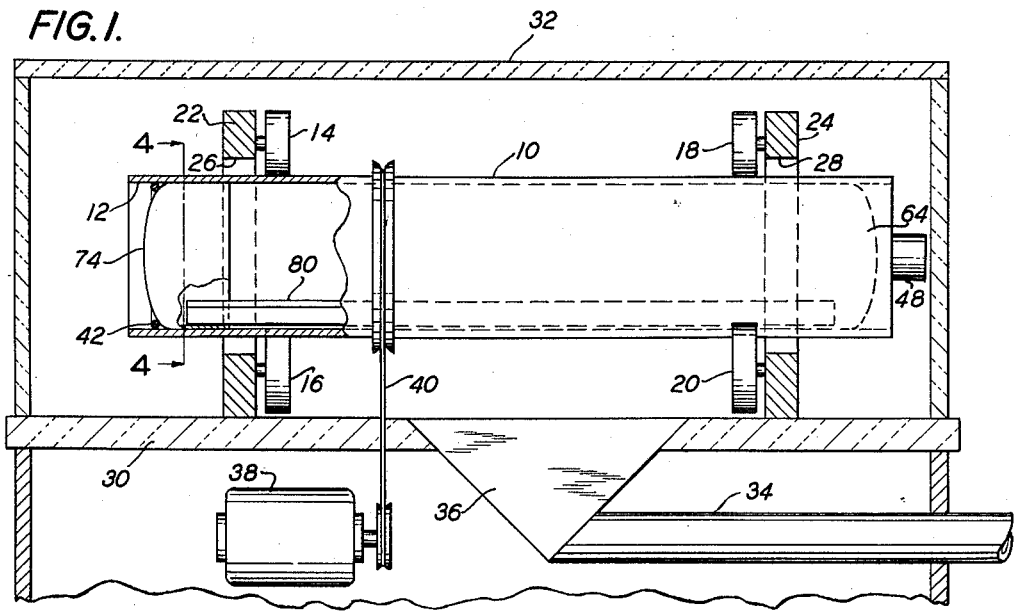
Fig. 1 is a schematic drawing in partial section of apparatus for carrying out the process including the cylindrical forming member which is broken away to show the pressure heads and the roll of material disposed within the forming member preparatory to carrying out the process.

With reference to Fig. 1, the apparatus for carrying out the process to make the subject tank comprises a substantially hollow and cylindrical forming member 10 having a cylindrical inside surface 12. The forming member is rotatably mounted on free rollers such as are shown at 14, 16, 18, 20 supported around the periphery of the forming member by supporting mounts 22, 24. Three rollers are connected to each supporting mount; one at the top and two at the bottom.

Each of the supporting mounts 22, 24 has a cut-out portion defined by surfaces 26, 28, respectively, so that the forming member extends through the supporting mounts. The supporting mounts are spaced apart and bonded to a base plate 30 of heat insulating material.

A box-like hood of insulating material 32 covers the forming member and the supporting mounts and rests on the base plate 30. A gas pipe or heat conduit 34 enters a trough 36 which opens through the base plate 30. A motor 38 is connected to the forming member through a mechanical linkage 40 for rotating the forming member at a high speed.

Figure 2:
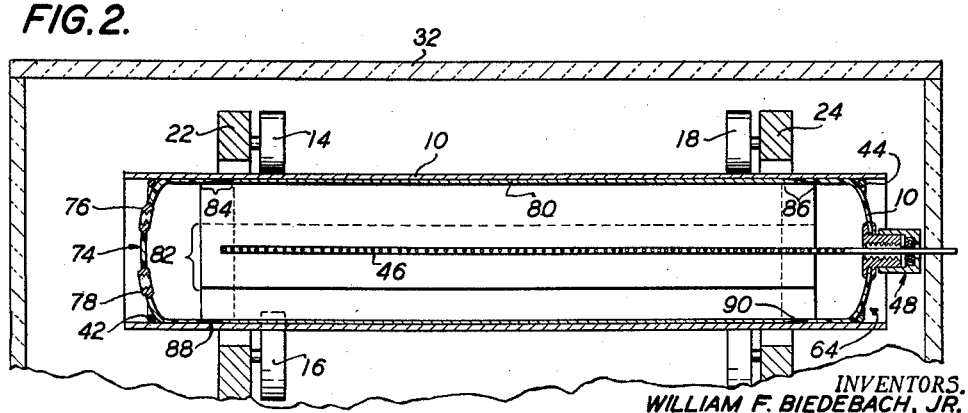
Fig. 2 is a schematic cross-sectional drawing taken along the longitudinal axis of the forming member showing the roll of material unwound and overlapping the edges of the respective pressure heads and overlapping itself along the length of the member.

With reference to Fig. 2, O-shaped rings 42, 44 are provided to fit into each end of the forming member. A resin injector or perforated tube 46 is supported through an adaptor 48 along the longitudinal axis of the forming member. The adaptor is connected centrally to a pressure head 64.

Figure 3:
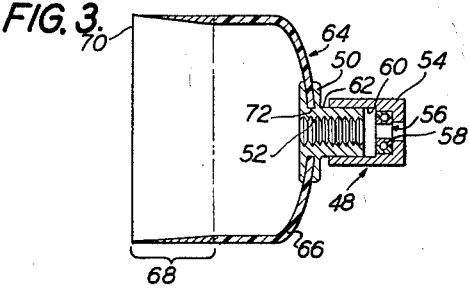
Fig. 3 is a longitudinal cross-section of a pressure head.

Fig. 3 shows the adaptor in better detail. It comprises a male plug 50 having a threaded center bore 52 and a female plug 54 having a center bore 56 in which is mounted a rotatable bearing 58. The female plug is adapted to fit over the male plug in a loose friction fit of their respective female and male surfaces 60, 62.

The process of manufacturing a tank in accordance with the invention and using the above described apparatus is as follows:

Two pressure heads are fabricated by disposing layers of Fiberglas material in a female mold, introducing a quantity of binder substance, and inserting a male mold to which pressure is applied for causing the binder substance to soak into the material. Such molds are conventional and are therefore not illustrated. The amount of binder substance is controlled so that the edge portions of the pressure heads remain unimpregnated and thus remain as flexible skirts. This is an important modification of the conventional molding process. The unimpregnated edge portions, being an integral part of the pressure heads, are suitable for future impregnation when overlapped with other Fiberglas material to form seams which result in the tank being of one-piece construction for all practical purposes.

Fig. 3 shows such a pressure head 64. It has a cup-shaped portion 66 and an unimpregnated edge portion or skirt 68. The edge portion may be combed out as shown so that it tapers from the material thickness at the cup-shaped portion to approximately zero thickness at its outer extremity 70. A hole is drilled through the center of the cup-shaped portion, and its periphery is surrounded by the material of the cup-shaped portion forming an annular surface 72. The male plug 50 of the adaptor is bonded to the material surrounding the annular surface 72 of the hole and protrudes outwardly.

Referring to Fig. 2, a second pressure head 74 is fabricated in a manner similar to the first pressure head shown in Fig. 3. If desired, holes may be drilled through the cup-shaped portion of this second pressure head and threaded fittings 76, 78 may be bonded to the periphery of these holes for accommodating inlet and outlet pipes when the completed tank is in use.

One of the pressure heads is inserted into the forming member. A tight roll of Fiberglas material 80 is inserted into the member so that one end of the roll overlaps the edge portion of the pressure head. The other pressure head is inserted into the other end of the member so that the other end of the roll overlaps the edge portion of this pressure head. Fig. 1 shows the pressure heads and the roll of material disposed within the forming member.

Figure 4:
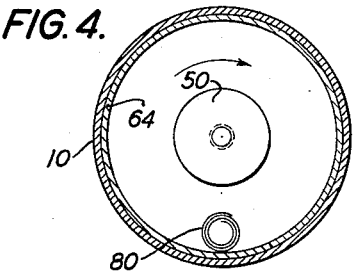
Fig. 4 is a sectional view taken along line 4—4 of Fig. 1.

As illustrated in Fig. 4, the roll of material is wound so that when the forming member is rotated the roll will tend to unwind or expand and conform to the inside surface of the member to form the body of the tank. It is essential in forming a closed tank that there be enough material on the roll so that the material of the roll still overlaps itself after it has expanded or unwound. The O-shaped rings 42, 44 are then inserted into each end of the forming member so that they rest against the bottom of the respective pressure heads to support the pressure heads and prevent resin throw-off out the ends of the forming member.

The member is then rotated so that it has a peripheral speed in excess of approximately 700 feet per minute, which is found to provide sufficient centrifugal force to cause the roll of material to unwind and conform tightly to the inside surface of the forming member.

As shown in Fig. 2, the material of the expanded roll overlaps itself along the length of the roll to form a lap indicated by the bracket 82. The material of the roll also overlaps the edge portions of the respective pressure heads as shown by the brackets 84, 86. All overlapping portions are tapered to fit as shown at 88, 90 and the distance of overlap is made greater than the fiber length in the material.

While the centrifugal force associated with the fast rotation of the member is forcing the material tightly against the inside surface of the forming member, the perforated tube 46 is introduced through the adaptor 48 and the binder substance is pumped within the member uniformly along the length of the forming member. The centrifugal force causes the binder substance to soak into the material and into all of its overlapping portions while keeping the material forced tightly against the inside surface of the forming member.

The perforated tube is removed and, while the forming member is still rotating, hot gases are introduced through the heating conduit 34 to the inside of the hood 32. These gases heat the member and the heat transfer through the member heat cures or solidifies the binder substance. This heating process also facilitates breaking the seal between the material and forming member when the tank is removed from the member. After the binder substance has solidified, the member is stopped from rotating and the tank is removed.

It should be observed that binder substance may be introduced to the inside of the forming member before the member is rotated. This might eliminate the need for drilling the hole in the pressure head 64 and the need for the perforated tube 46 and the adaptor 48. However, it is preferable that the binder substance be introduced after the member is rotated to obtain a more uniform saturation of the material with the binder substance.

One binder substance which has been used successfully is available commercially under the trade name Plastican 9500. This is a thermosetting polyester resin to which is added 1% DDM catalyst, 1% BZP, and ½% Mold Guard. DDM catalyst is a solution of 60% methyl ethyl ketone peroxide in dimethyl phalate; BZP is a solution of 50% benzoyl peroxide in tricresyl phosphate, and Mold Guard is a commercially available silicone product. This resin can be pigmented for providing various colors and will harden or set when thus catalyzed at about 180° F.

The tank so formed has a smooth outer surface and a smooth inner surface, and for all practical purposes is of one piece integral construction. The seams formed by the overlapping portions are practically invisible and are found to be capable of carrying as much tension as can be carried by any other portion of the tank when the tank is put under pressure.

The seams of the tank formed according to the process of the invention are primary bonds; hence, in effect the tank is seamless because the strength of the seams is essentially the strength of the reinforced material and not merely that of the binder substance employed. Conventional tanks are fabricated with seams that are secondary bonds, in which the strength of the seams is generally limited by the strength of the binder substance employed. The result is that the best conventional tanks are observed to fail in the seams at pressures in the range of 5,000 pounds per square inch. Whereas, using about the same amount of material, a tank may be formed according to the process of the invention that can take pressures in the range of 30,000 to 60,000 pounds per square inch; and when the tank finally fails, the failure is not necessarily at the seams.

We claim:

1. A process for fabricating a tank which comprises disposing two substantially rigid pressure heads having edges of unimpregnated porous material and a roll of unimpregnated porous material within a rotatable member having an inside surface, with the said pressure heads facing each other and the said roll of material disposed between the pressure heads so that each end of the roll overlaps the edge of a respective pressure head, rotating the member so that the centrifugal force created causes the roll of material to unwind and conform to the inside surface of the member with the ends of the expanded roll overlapping the unimpregnated edges of the respective pressure heads and with the material of the expanded roll overlapping itself, introducing a resinous substance inside the rotating member and the roll of material so that the centrifugal force causes the resinous substance to impregnate the bulk of the unimpregnated porous material, and hardening the resinous substance to make the material rigid and to bond the overlapping portions of the material together.

2. A process according to claim 1 wherein the resinous substance is hardened by heating the rotatable member to heat-cure the resinous substance.

3. A process according to claim 1 wherein the porous material is made up of fibres of a certain length and the overlapping portions of the material overlap a distance at least substantially as great as the fibre length.

4. A process according to claim 1 wherein the overlapping portions of the porous material are tapered to fit together to provide a smooth seam.

5. A process for fabricating a cylindrical tank which comprises molding two pressure heads by confining a porous material in a shaped mold, forcing a binder substance to impregnate a cup-shaped portion of the confined material whereby an integral skirt of confined material remains unimpregnated, and hardening the binder substance, disposing the two pressure heads and a roll of unimpregnated porous material within a rotatable forming member having a cylindrical inside surface, said roll of material being disposed between the pressure heads so that each end of the roll of unimpregnated material overlaps the unimpregnated skirt of a respective pressure head, rotating the member at a high speed so that the centrifugal force created causes the roll of material to unwind and conform to the inside surface of the member with its respective ends overlapping the edges of the respective pressure heads, and with the material of the unwound roll overlapping itself, introducing a binder substance to the inside of the rotating member so that the centrifugal force forces the binder to impregnate the bulk of the porous material, and hardening the binder substance to make the material rigid and to bond the overlapping portions of the material together.

6. In the process of forming a composite structure from at least two pieces, wherein at least part of both pieces is composed of a flexible porous material, the improvement which comprises impregnating part of the porous material of at least one of the pieces with a binder substance and hardening the binder substance so that the resulting piece has unimpregnated porous material extending from the impregnated and hardened part, overlapping unimpregnated porous material of one piece with unimpregnated porous material of the other piece, rotating the pieces along with a quantity of binder substance in a rotatable member having an inner surface so that the centrifugal force created causes the material to conform to the surface and forces the binder substance to impregnate the bulk of the overlapping material, and hardening the binder while continuing to rotate the member to bond the overlapping portions of the material together.

7. The process of claim 6 wherein the rotatable member is heated in order to heat-cure and harden the binder substance.

8. The process of claim 6 wherein the porous material is composed of fibers, and the pieces overlap each other for a distance at least substantially as great as the fiber length in the direction of the overlap.

9. The process of claim 6 wherein the overlapping portions of the pieces are tapered to fit together, thereby forming a smooth seam having improved structural characteristics.

References Cited in the file of this patent

UNITED STATES PATENTS

| | | |
|---|---|---|
| 1,161,756 | Wolever | Nov. 23, 1915 |
| 2,016,851 | Brady | Oct. 8, 1935 |
| 2,278,858 | Fields | Apr. 7, 1942 |
| 2,349,549 | Hardman et al. | May 23, 1944 |
| 2,371,305 | Marks | Mar. 13, 1945 |
| 2,374,128 | Pinckert | Apr. 17, 1945 |
| 2,409,486 | Hagen et al. | Oct. 15, 1946 |
| 2,413,823 | Gits | Jan. 7, 1947 |
| 2,444,533 | Richardson | July 6, 1948 |
| 2,471,296 | Allen et al. | May 24, 1949 |
| 2,573,693 | De Bell | Nov. 6, 1951 |
| 2,592,419 | Harper et al. | Apr. 8, 1952 |
| 2,633,605 | Brucker | Apr. 7, 1953 |
| 2,644,198 | Crawford | July 7, 1953 |
| 2,659,107 | De Bell | Nov. 17, 1953 |
| 2,726,222 | Palmquist et al. | Dec. 6, 1955 |
| 2,739,917 | Schulze | Mar. 27, 1956 |